Jan. 31, 1950 W. C. SEIFERT 2,495,779
METHOD FOR THE DETERMINATION OF EXPOSURE TIMES
Filed July 3, 1946 2 Sheets-Sheet 1

INVENTOR.
William C. Seifert
BY Louis Burgess
Attorney

Jan. 31, 1950   W. C. SEIFERT   2,495,779
METHOD FOR THE DETERMINATION OF EXPOSURE TIMES
Filed July 3, 1946   2 Sheets-Sheet 2

INVENTOR.
William C. Seifert
BY Louis Burgess

Attorney

Patented Jan. 31, 1950

2,495,779

UNITED STATES PATENT OFFICE 2,495,779

METHOD FOR THE DETERMINATION OF EXPOSURE TIMES

William C. Seifert, Narberth, Pa., assignor of one-half to Donald W. Kent, Whitemarsh, Pa.

Application July 3, 1946, Serial No. 681,225

6 Claims. (Cl. 95—5)

This invention is a new and useful improvement in methods for the determination of exposure times. The method is principally applicable to photographic operations, including the photographing of objects or fields external to the camera and the reproduction (enlargement or reduction) of transparencies in which the image is reproduced by focusing through a suitable lens onto a suitably prepared sensitized surface. The method may conversely be applied to control the intensity and distribution of the applied illumination where the illumination of the object or field to be photographed is subject to the control of the operator. This may occur for example where the illumination is artificial and subject to variation, or, in the case of natural illumination, by selecting a time at which the illumination is found by the application of the method of my invention to be most suitable.

My method is of especial value in making relatively large photographs, as is frequently necessary in industrial practice and where a substantial amount of time and material would otherwise be lost in establishing the optimum exposure time by trial and error. The method is also of value in any case where high quality of product is desired and it is therefore essential that the optimum exposure time be accurately predetermined.

The method will be fully understood from the following description read in conjunction with the drawings in which.

Figure 1:
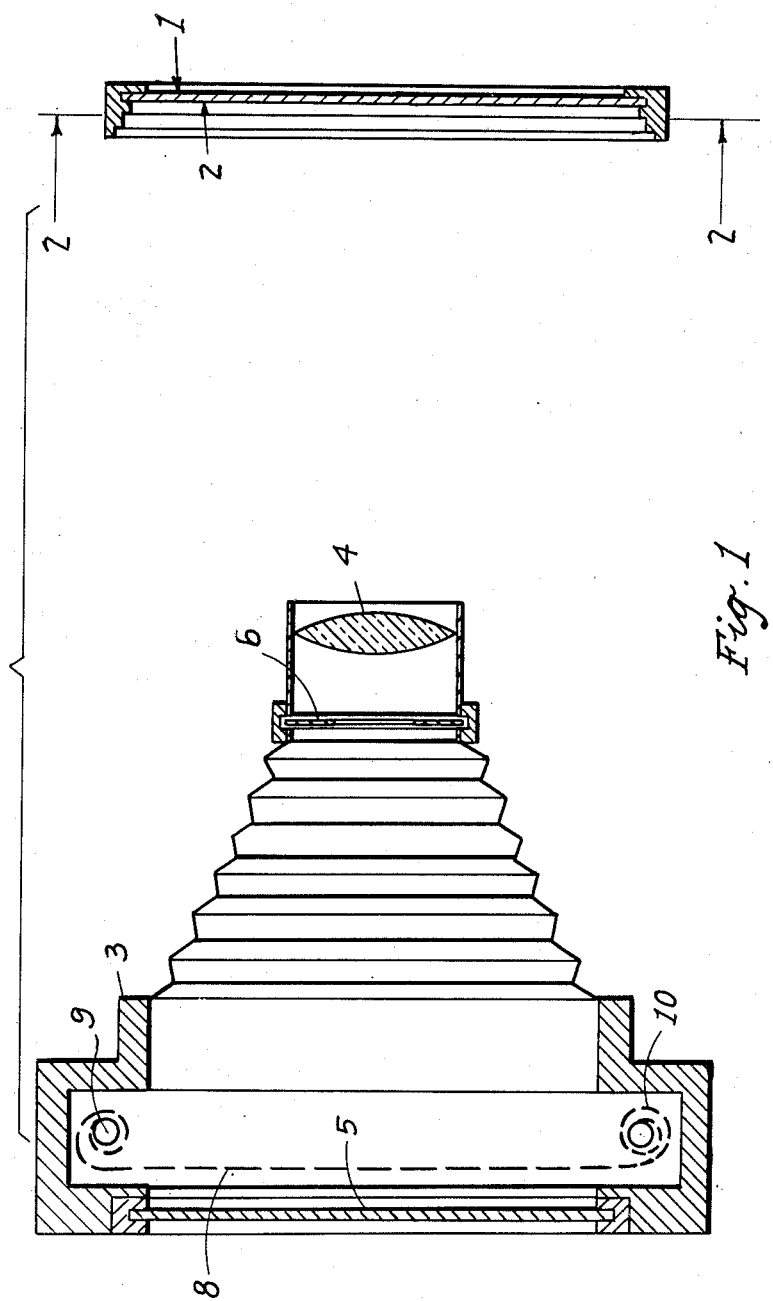
Fig. 1 is a vertical section through apparatus diagrammatically indicated in which my method may be carried out.

Referring to the drawings, 1 is an object defining the surface 2 carrying the image to be photographed. While I find it convenient to illustrate my method by reference to a plane surface such as 2, it is not so limited and may also be applied to three dimensional fields which have considerable depth. In photographing, the object 1 is set up before camera 3 so that light reflected from various parts of surface 2 passes through lens 4 of camera 3 into the body of the camera. The volume of light is subject to control by the iris diaphragm 6 while the duration of time within which this light impinges on a plate or film positioned at 5 is determined by the focal plane shutter 8 carried on spools 9 and 10.

Figure 2:
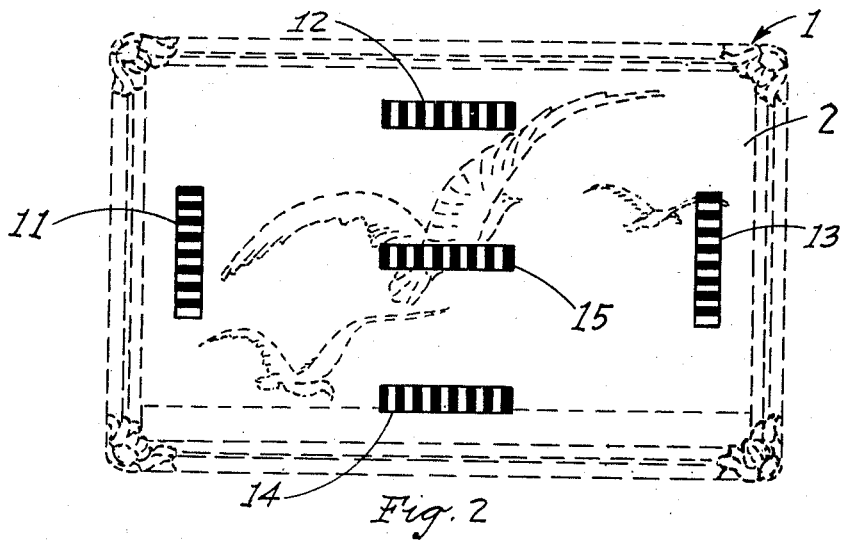
Fig. 2 is a view of part of Fig. 1 on the plane indicated by 2—2.

In one embodiment of the method of my invention I spot at various places on the surface 2, or alternatively at various places in the field to be photographed, banded areas such as 11, 12, 13, 14 and 15 (Fig. 2). Where the object or field to be photographed is relatively large, these banded areas may be relatively small in relation to the field. If the object or field to be photographed is not relatively large, a single banded area may be employed covering all or at least a major portion of the object or field to be photographed. Each of the banded areas comprises stripes alternately light-absorbent and light-reflective. The light-absorbent stripes should have a low coefficient of reflection for the light or the wave length of light to be used in the final photographic operation, and where the final photographic operation is to be done with white light, these absorbent stripes will preferably be dull black in color. The light-reflective stripes should have a coefficient of reflection similar or substantially similar to that of the surface to be photographed in the vicinity of the banded area. In case the field to be photographed is relatively large, this may be done merely by leaving the field itself exposed between the light-absorbent stripes.

In photographing fields of intermediate or smaller size, the banded areas may be short lengths of film containing fully exposed and darkened stripes, which are light-absorbent, separated by intermediate transparent areas, i. e., transparent stripes through which light reflected from the background will pass to the camera lens. The net effect of this arrangement is that such lengths of film provide light-absorbent stripes separated by other stripes, i. e., the transparent areas through which all of the light reflected from the background passes to the camera lens.

In many cases the object to be photographed has a white background and in such cases it is frequently possible to substantially duplicate the light reflective character of the background by the use of a white or tinted paper. In such cases the banded area may be formed of a piece of sensitized paper which has been exposed, developed and fixed to form alternate black and light stripes, in which the light-reflective stripes have a coefficient of reflection approximating the coefficient of reflection of the background. In this case it may at times also be convenient to place these banded areas adjacent to but beyond the outer margins of the object to be photographed.

When employing my method for photographing relatively large objects, I preferably position a ground observation glass at 5 in the preliminary steps of my method, focusing the banded areas directly onto this observation glass. At this point the image of the light-absorbent stripes is preferably not over ⅛ inch in width and for best results not over 1/64 inch in width. The image of the light-absorbent stripes on the glass at 5 must be relatively sharp, with well defined edges, for which reason the light-absorbent stripes within or adjacent to the object or field to be photographed must also be relatively sharp with well defined edges. Where these are much larger and the corresponding images on the ground glass, i. e., where there is a considerable reduction in photographing, allowance may be made for the improvement in definition which results from the reduction in size effected by the camera.

Having established by observation or calculation that the image of the banded areas on the ground glass at 5 is of the proper dimensions, I may either substitute for the ground observation glass a film or a plate or a suitable sensitized photographic paper. Where economy of material is especially desired, I may even use small pieces of sensitized paper occupying the areas within which the banded areas were projected onto the glass at 5. The substitution of the plate or film or the sensitized paper is, of course, carried out in the absence of any light which would affect the same, and with the focal plane shutter 8 completely intercepting any light from lens 4. The plate or film or sensitized paper is then exposed for an exposure time, which is arbitrarily taken as close to the optimum as it is possible to predetermine it. It is then removed, developed and examined.

It would ordinarily be assumed that on examination the width of the bands in the plate or film or paper within the projected image of the light-reflective bands of the banded areas would be exactly equal in width to the projected image of these bands as viewed on the ground observation glass at 5, and that varying the time of exposure would merely vary the extent of darkening produced within such bands. By experimental investigation I have found, however, that this is not so, and that with bands of the dimensions hereinbefore specified, the absolute width of the image, i. e., the darkened band within such plate or film or paper is a function of the length of time over which the same was exposed. Where the time of exposure for light of any given intensity is optimum, the width of such bands after exposure and development is exactly equal to the width of the image as observed on the glass. If exposed over this optimum time, the band will be found to have widened out, exceeding the width of the image as observed on the observation glass, and conversely if exposed under this optimum time, the band will be found to be thinner than the corresponding image on the observation glass. There is therefore only one definite exposure time at which an exact dimensional reproduction of the image as observed on the observation glass is obtained.

In order to determine whether the image of the light-reflective bands in the field is equal to, greater than, or less than the image of these bands as shown on the observation glass, I prefer to examine the plate or film or sensitized paper, after development and fixing, by the use of a microscope of about 50 diameters' magnification preferably equipped with a self-contained scale by which the absolute width of the bands may be observed. It is possible in this manner to determine by calculation the extent to which the image of the light-reflective bands is wider or thinner than the projected image of such bands in the plane of the film or plate or sensitized paper. For practical use, however, I have found that the best arrangement for determining this effect is by the use of banded areas in the field to be photographed, in which the light-reflective bands are exactly equal in width to the light-absorbent bands. In this way the banded areas are composed of a number of parallel opaque bands so spaced that the spacing between two such bands is exactly equal to the width of the bands themselves. Thus, any growth of the image of the light-reflective (transparent) bands results in the production in the plate or film or sensitized paper of a darkened band, which exceeds the width of the intermediate undarkened band. If the two dimensions of the darkened and undarkened bands are exactly equal, the exposure time obtaining in the test is the optimum for use in the actual photographic operation. By determining whether the darkened bands obtained by exposure, development and fixing are wider or narrower than the intermediate bands, it can be ascertained whether the exposure time obtaining in the test is over or under the optimum.

In one method of carrying out my invention I repeat the tests in the manner hereinabove described, varying the time of exposure until I have found in this way the optimum exposure time, i. e., the exposure time at which the width of the exposed and now darkened bands is exactly equal to that of the intermediate bands, and then proceed to the actual photographic operation, using the time so indicated for photographing the particular field or object.

In an alternative method of carrying out the invention, I may employ a single such preliminary test and if the time of exposure used in this test does not yield light and dark bands which are identical in width, I may measure the exact extent to which the image of the light-reflective bands is too wide or too narrow, and by independent tests determine the coefficient or factor by which the particular exposure time obtaining in the test should be multiplied to obtain the optimum time.

When proceeding in the manner hereinbefore described to determine the optimum exposure time for photographing a relatively large object such as that indicated in Fig. 2, it may be found that some of the banded areas 11-15 inclusive show that the exposure time obtaining in a particular test is optimum whereas other banded areas do not. This indicates that the illumination of the field is not uniform or alternatively that some part of the field requires more or less light intensity than some other part. In this case the operator will vary the illumination at different parts of the field to be photographed in accordance with the information obtained in the test until each of the banded areas simultaneously shows the same optimum exposure time. Since the phenomenon hereinabove described occurs regardless of the color of the light reflected from or transmitted from the subject, the method is directly applicable in color photography. It may therefore be applied in making three primary color separation negatives from full color copies or transparencies. In such a case the pieces of sensitized paper or film to be preliminarily exposed, developed and fixed for any particular color or color band will be the same or similar in composition to those to be used in the final photographic operation.

Where the banded areas to be used in the test are relatively small, i. e., where the field is not substantially reduced in photographing, I find it advisable to make the banded areas in accordance with the method shown and described in my copending application Serial No. 670,159 filed May 16, 1946.

Figure 3:
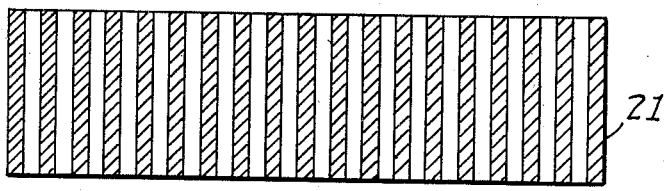
Fig. 3 is a top view of a device which may be employed in carrying out the method of my invention.
Figure 4:
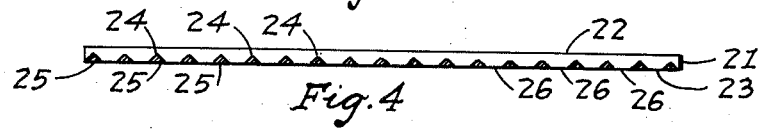
Fig. 4 is a side view of the construction shown in Fig. 3.

Referring to Fig. 3, 21 designates a sheet of glass, the surfaces 22 and 23 of which have been optically polished. In surface 23 of glass 21 I form a number of relatively narrow parallel grooves 24. These grooves are formed with sharp edges, the preferred method of forming same being the use of a diamond point in a machine of the type used to make diffraction gratings. After grooves 24 have been cut in surface 23, they are filled with some material capable of forming or being converted into a substance opaque to light which can be set or otherwise permanently anchored in the grooves. The glass containing this substance is then baked or otherwise treated to set the substance to a hard enamel and after this operation surface 23 is again finished by optical grinding and polishing to develop a smooth surface containing opaque bands 25 and therebetween transparent bands 26.

Figure 5:
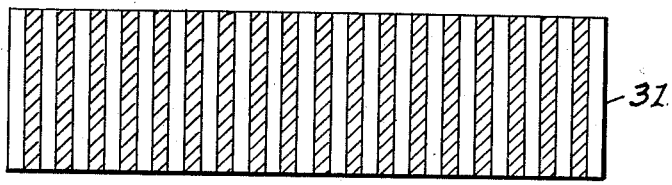
Fig. 5 is a top view of another device which may be used in carrying out the method of my invention.
Figure 6:
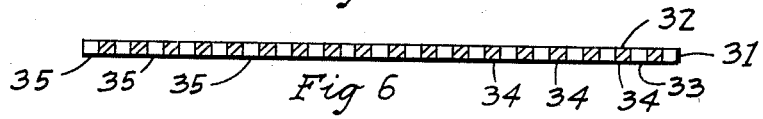
Fig. 6 is a side view of the construction shown in Fig. 5.

I may use the device in this form as a banded area in accordance with the method hereinabove described, but since it is rather expensive to prepare I find it preferable to employ this device to generate a number of banded areas which are relatively inexpensive and equally satisfactory for my purpose. To this end glass 21 is placed with surface 23 firmly in contact with a strip of photographic film which is then uniformly exposed to a particular light source for the optimum exposure time. The film is then fixed and developed in the usual way, resulting in a strip 31 (Figs. 5 and 6) bounded by plane surfaces 32 and 33 containing alternate opaque bands 34 which were overlain by transparent bands 26 in device 21, and alternate transparent bands 35 which were overlain by opaque bands 25 in device 21. The opaque bands 34 will be relatively sharp-edged and since the strip 31 was uniformly exposed to the light source for the optimum time, the absolute width of the opaque bands 34 would be equal to the absolute width of opaque bands 25 in device 21.

Preferably the absolute width of opaque bands 25 and transparent bands 26 in device 21 are equal to each other so that opaque bands 34 and transparent bands 35 in strip 31 will also be exactly equal to each other. Other strips, such as 31, may be used as banded areas 11—15 in carrying out the method of my invention. Where the background of the field is white I may proceed similarly except that I use a strip of sensitized paper instead of a strip of photographic film to produce a banded area containing opaque bands such as 34 and white bands such as 35, the paper being so chosen that these white bands have a coefficient of reflection approximately equal to that of the background. The absolute width of opaque bands 34 will be so chosen that the absolute width of the image of these bands as viewed on glass 5 is not over ⅛ of an inch and preferably not over 1/64 of an inch.

While I have described my method in application to a relatively large object or field to be photographed, it will be understood that it is not so limited and that in any case where it is necessary or desirable to exactly predetermine the optimum exposure time, my method is applicable; thus in photographing smaller objects or fields, I may, if desired, use a single banded area occupying all or substantially all of the field to be photographed proceeding in accordance with the foregoing description.

I claim:

1. Method of determining exposure times for photographic operations which comprises placing at least one banded area within the field to be photographically reproduced, said banded area including at least two dark colored stripes having a low coefficient of reflection for the light to be used in the photographic reproduction of said field, and between each two dark colored stripes one intermediate light colored stripe having for such light a higher coefficient of reflection at least substantially equal to the field adjacent said banded area, determining the width of at least one light colored stripe of a photographically in focus projected image of at least two dark and one intermediate light colored stripe portion of said banded area, preparing several photographic reproductions of said image on light sensitive surfaces at substantially the same degree of enlargement as said projected image and using a different exposure time for each, determining the exposure time of that reproduction of said banded area for which the reproduced image of said light colored stripe is equal to said determined width, and photographically reproducing said field using the exposure time so determined.

2. Method according to claim 1 in which said banded area is selected with a dark colored stripe width photographically projectable from its placed position for said width determination for an in focus projected image width not over substantially ⅛ of an inch.

3. Method according to claim 1 in which said banded area is selected with a dark colored stripe width photographically projectable from its placed position for said width determination for an in focus projected image width not over substantially 1/64 of an inch.

4. Method of determining exposure times for photographic operations which comprises placing at least one banded area within the field to be photographically reproduced, said banded area including at least two dark colored stripes having a low coefficient of reflection for the light to be used in the photographic reproduction of said field and between each two dark colored stripes, one light colored stripe of equal width with said dark colored stripes and having for such light a higher coefficient of reflection at least substantially equal to the field adjacent said banded area, preparing several photographic reproductions of a photographically reproduced image of at least two dark and one intermediate light colored stripe portion of said banded area at substantially the same degrees of enlargement using a different exposure time for each, determining the exposure time of that reproduction of said banded area for which the width of the dark stripes equals the width of the light stripes in the reproduced image, and photographically reproducing said field using the exposure time so determined.

5. Method according to claim 4 in which said banded area is selected with a dark colored stripe width photographically projectable from its placed position for said width determination for an in focus projected image width not over substantially 1/8 of an inch.

6. Method according to claim 4 in which said banded area is selected with a dark colored stripe width photographically projectable from its placed position for said width determination for an in focus projected image width not over substantially 1/64 of an inch.

WILLIAM C. SEIFERT.

REFERENCES CITED

The following references are of record in the file of this patent:

UNITED STATES PATENTS

| Number | Name | Date |
|---|---|---|
| 2,060,816 | Mackay | Nov. 17, 1936 |
| 2,186,138 | Henderson | Jan. 9, 1940 |
| 2,244,992 | Guerrero | June 10, 1941 |

OTHER REFERENCES

Mees: "The Theory of the Photographic Process," MacMillan Co., 1942, pages 888 and 895 to 898 cited.

Clerc: "Ilford Manual of Process Work," Ilford Limited, London, third edition 1941, pages 377 and 378 cited.

Mauge: "Science et Industries Photographiques," "Etude du Pouvoir Resolvant etc.," 2 Serie, Tome VII, No. 9, September 1936, pages 297 to 304, pages 297, 298, 302 and 303 especially cited.